US 9,695,970 B2

(12) United States Patent
Rogers et al.

(10) Patent No.: US 9,695,970 B2
(45) Date of Patent: Jul. 4, 2017

(54) COMPOSITE PULSATION DAMPENER

(71) Applicant: Performance Pulsation Control, Inc., Richardson, TX (US)

(72) Inventors: John Thomas Rogers, Garland, TX (US); Gregg M. Mathiak, Plano, TX (US); Timothy A. Douglas, Park City, UT (US)

(73) Assignee: Performance Pulsation Control, Inc., Richardson, TX (US)

( * ) Notice: Subject to any disclaimer, the term of this patent is extended or adjusted under 35 U.S.C. 154(b) by 247 days.

(21) Appl. No.: 14/509,961

(22) Filed: Oct. 8, 2014

(65) Prior Publication Data
US 2015/0096639 A1 Apr. 9, 2015

Related U.S. Application Data

(60) Provisional application No. 61/888,402, filed on Oct. 8, 2013.

(51) Int. Cl.
*F16L 55/04* (2006.01)
*F16L 55/05* (2006.01)

(52) U.S. Cl.
CPC ............ *F16L 55/041* (2013.01); *F16L 55/05* (2013.01)

(58) Field of Classification Search
USPC ..................................................... 138/30, 26
See application file for complete search history.

(56) References Cited

U.S. PATENT DOCUMENTS

| | | | | |
|---|---|---|---|---|
| 2,097,985 A * | 11/1937 | Maryott | .................. | B05B 9/047 114/74 T |
| 2,875,788 A * | 3/1959 | Pier | ....................... | F16L 55/052 138/30 |
| 3,508,677 A * | 4/1970 | Laibson | ................ | B29C 53/602 220/590 |
| 3,815,773 A * | 6/1974 | Duvall | ..................... | F16J 12/00 138/30 |
| 4,004,706 A * | 1/1977 | Guldenfels | ............ | B65D 90/02 220/586 |
| 4,265,274 A | 5/1981 | Zahid | | |
| 4,585,400 A | 4/1986 | Miller | | |
| 4,603,711 A * | 8/1986 | Porel | ....................... | F15B 1/106 138/30 |
| 4,714,094 A * | 12/1987 | Tovagliaro | ................ | F15B 1/24 138/31 |
| 4,982,856 A * | 1/1991 | Stokes | .................... | B29C 65/02 220/567.3 |
| 5,129,427 A * | 7/1992 | White | ................... | F16L 55/053 138/30 |

(Continued)

OTHER PUBLICATIONS

Final Office Action dated Dec. 8, 2014 in connection with U.S. Appl. No. 13/544,734; 16 pages.

(Continued)

*Primary Examiner* — James Hook

(57) ABSTRACT

A pulsation control device is constructed at least partially of a composite carbon (and/or other fibers)/epoxy exostructure having an oblong cylindrical or spheroidal shape, optionally with metallic portions or reinforcements, together with a non-metallic polymer non-load sharing liner. A pressure drop tube preferably extends from an opening through an exterior wall of the body into an interior space within the body.

15 Claims, 2 Drawing Sheets

(56) References Cited

U.S. PATENT DOCUMENTS

| | | | | |
|---|---|---|---|---|
| 5,499,739 | A | * | 3/1996 | Greist, III ............ B29C 53/602 138/30 |
| 5,860,452 | A | | 1/1999 | Ellis |
| 7,013,925 | B1 | * | 3/2006 | Saveliev ................ F15B 1/021 138/26 |
| 2004/0108319 | A1 | * | 6/2004 | Bettinger ............... B65D 88/06 220/651 |
| 2005/0194054 | A1 | * | 9/2005 | Moskalik ................ B60K 6/12 138/31 |
| 2007/0131295 | A1 | * | 6/2007 | Rose ........................ B60T 1/10 138/30 |
| 2008/0308168 | A1 | * | 12/2008 | O'Brien, II ............. B60K 6/12 138/31 |
| 2009/0107570 | A1 | * | 4/2009 | Weber ...................... F17C 1/16 138/30 |
| 2009/0126815 | A1 | * | 5/2009 | Rajabi ...................... F15B 1/24 138/31 |
| 2009/0139349 | A1 | * | 6/2009 | Drahm ................. G01F 1/8409 73/861.357 |
| 2010/0084033 | A1 | * | 4/2010 | Hummelt ............... F15B 1/106 138/30 |
| 2013/0206629 | A1 | | 8/2013 | Carsten et al. |
| 2015/0001229 | A1 | * | 1/2015 | Helmig .................... F17C 1/06 220/592 |

OTHER PUBLICATIONS

International Search Report dated Jan. 21, 2015 in connection with International Application No. PCT/US2014/059758; 2 pages.
Written Opinion of the International Searching Authority dated Jan. 21, 2015 in connection with International Application No. PCT/US2014/059758; 4 pages.

* cited by examiner

COMPOSITE PULSATION DAMPENER

This application claims priority to U.S. Provisional Patent Application No. 61/888,402 filed Oct. 8, 2013 and entitled "COMPOSITE PULSATION DAMPENER." The content of the above-identified patent document is incorporated herein by reference.

TECHNICAL FIELD

The present application relates generally to pulsation dampeners and, more specifically, to pulsation dampeners constructed of metallic and non-metallic materials.

BACKGROUND

Pulsation dampeners are used with cyclic hydraulic (e.g., reciprocating pump) systems circulating fluids to reduce the fluid pressure peaks that would otherwise accelerate deterioration of the system, the system's fluid end expendable parts, and equipment upstream or downstream from the system with each subsequent pulsation. Failure to control pressure peaks inevitably affects the operating performance and operational life of a reciprocating pump in many types of applications, including drilling, well service, oil field service, operation of industrial equipment, and mining.

Pulsation dampeners are typically manufactured from steel or other metals or metal alloys due to the combination of the large vessel sizes (outer diameters greater than 20 inches) and high pressures that must be contained (on the order 10,000 pounds per square inch or "psi"). However, the use of steel or similar metals makes the pulsation dampeners extremely heavy, and thus cumbersome to mount or dismount on site for installation, maintenance, or replacement. Particularly in remote locations, equipment necessary to lift a pulsation dampener into or out of place is not always convenient to obtain or operate.

There is, therefore, a need in the art for an improved pump dampener that may be handled with greater ease.

SUMMARY

A pulsation control device is constructed at least partially of a composite carbon (and/or other fibers)/epoxy exostructure having an oblong cylindrical or spheroidal shape, optionally with metallic portions or reinforcements, together with a non-metallic (plastic, e.g., HDPE, polymer) non-load sharing liner and metallic port nozzles consisting of integral dome and piping flanges. A pressure drop tube preferably extends from an opening through an exterior wall of the body into an interior space within the body. Alternatively, a different pressure drop device such as an orifice plate of one or more materials may be mounted against the outlet nozzle exterior to the body.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge dampener that controls or partially controls pulsation amplitudes.

Figure 1:
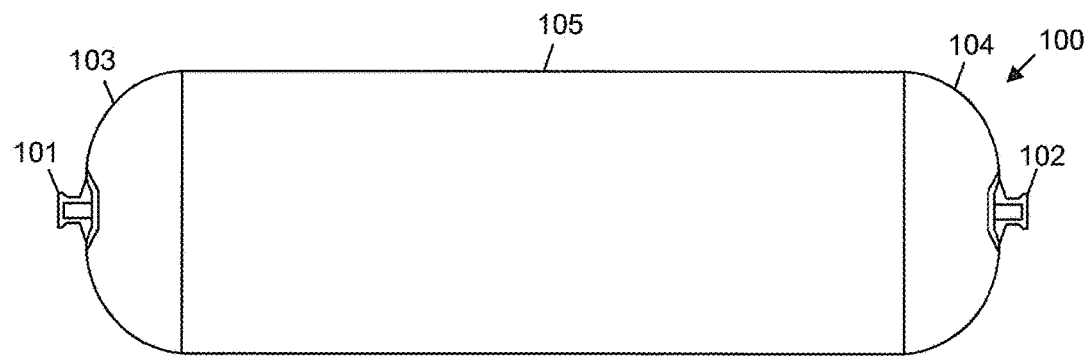
FIG. 1 is an external side view of a composite pulsation dampener according to an exemplary embodiment of the present disclosure.

FIG. 1 is an external side view of a composite pulsation dampener according to an exemplary embodiment of the present disclosure. Pulsation dampener 100 has an intake 101 for receiving pumped fluids and an outlet 102 for discharging pump fluids under pressure. In use, the intake 101 and outlet 102 may be substantially interchangeable. The intake 101 and outlet 102 are formed from metallic port nozzles consisting of integral dome and piping flanges, as illustrated in FIG. 1. Dome-shaped end caps 103 and 104 support the intake 101 and outlet 102 and are separated by a cylindrical central portion 105 of the body of the pulsation dampener 100.

Pulsation dampener 100 is constructed at least partially of a composite material (with possibly some metallic infrastructure or reinforcement), including a carbon (and/or other fibers)/epoxy exostructure with a liner. For example, the liner may be formed of a polymer material. The composite pulsation dampener 100 depicted has a generally oblong planform with elliptical corners, curved (cylindrical) exterior walls and rounded or hemispherical (dome-shaped) ends each including an inlet into or an outlet from the interior space within. Alternative embodiments may use a spheroidal shape, without the elongated central cylinger. Not depicted in FIG. 1 are vent and drain connections, lifting lugs, a support for mounting, inlet and outlet flange connections, the pressure drop assembly, and a nameplate, which those skilled in the art will recognize are conventionally part of a pulsation dampener.

The use of a composite carbon/epoxy material, optionally together with metal, in the construction of a pulsation dampener is unique, and without precedent for the extremely high pressures (in the range of 10,000 psig) that must be contained by the composite pulsation dampener 100 in combination with the large outer diameter (greater than 20 inches) of the body of the composite pulsation dampener 100 necessary for use in drilling operations. Of course, the system disclosed may be employed with much lower pressures, on the order of 5,000 to 7,500 psig, or much higher pressures, on the order of 15,000 to 25,000 as examples. In addition, the composite pulsation dampener 100 is an American Society of Mechanical Engineers (ASME) Boiler and Pressure Vessel Code (BPVC) Section X (Fiber-Reinforced Plastic Pressure Vessels) Appendix 8 Class III, Type IV rated and stamped composite vessel in terms of operating pressure and outer diameter combination.

The proposed structure also provides improved corrosion resistance to pumped fluids and in maritime environments.

The composite pulsation dampener 100 enjoys a weight savings of around 75-80% as compared to metallic pulsation dampeners for a specified set of operating pressure and volume capacity parameters, and will therefore benefit from lower handling and transportation costs. As compared to the weight of a completely metallic vessel, the composite pulsation dampener 100 reduces foundation loads, shaking forces, rolling and pitching forces on flotation vessels.

The composite pulsation dampener 100 also enjoys better corrosion resistance, and provides better protection from erosion due to the polymer liner. Moreover, composite materials have better acoustic and vibration dampening properties as compared to steel due to high co-efficient of damping and higher specific stiffness, improving the operating performance of the pulsation dampener 100 over a metallic counterpart.

The composite material also provides low thermal expansion. The low number of joints and low part count provides better reliability to the composite pulsation dampener 100, which in results in a better service life. Because the manufacturing process may be automated, construction involves lower labor costs.

Figure 2:
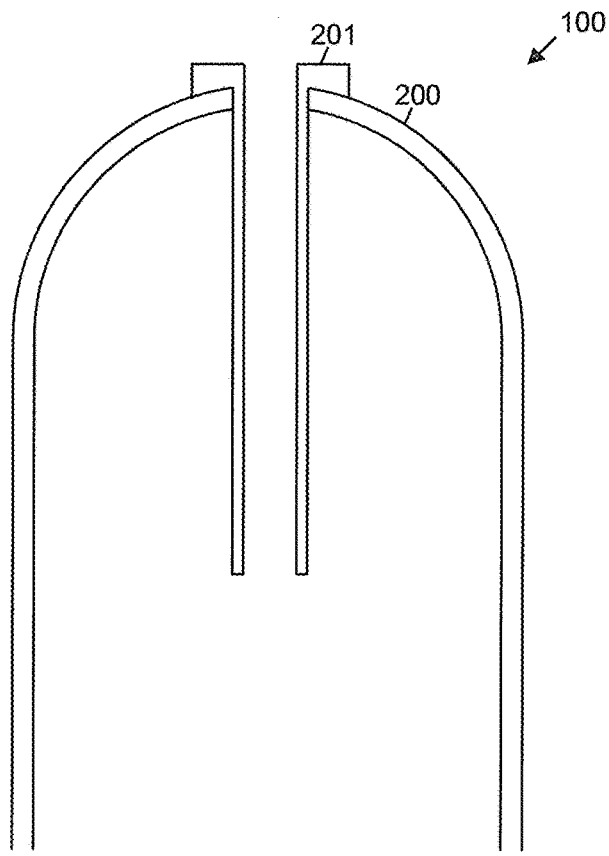
FIG. 2 is a sectional side view of portions of the composite pulsation dampener of FIG. 1.

FIG. 2 is a sectional side view of portions of the composite pulsation dampener of FIG. 1. The composite pulsation dampener has an exterior wall 200 and, in the example shown, includes a pressure drop tube 201 fitted to an opening (inlet or, preferably, outlet) through the exterior wall and extending into the interior space. Vent and drain connections (not shown in FIG. 1 or 2) are also provided, external of the device and possibly integrally formed with nozzles supplied for making connections to the inlet and outlet of the composite pulsation device. For simplicity and clarity, the pressure drop tube or alternative pressure drop device is not shown in FIG. 1 or 3-6, although the use of such devices with the embodiments of those figures is expressly contemplated.

Figure 3:
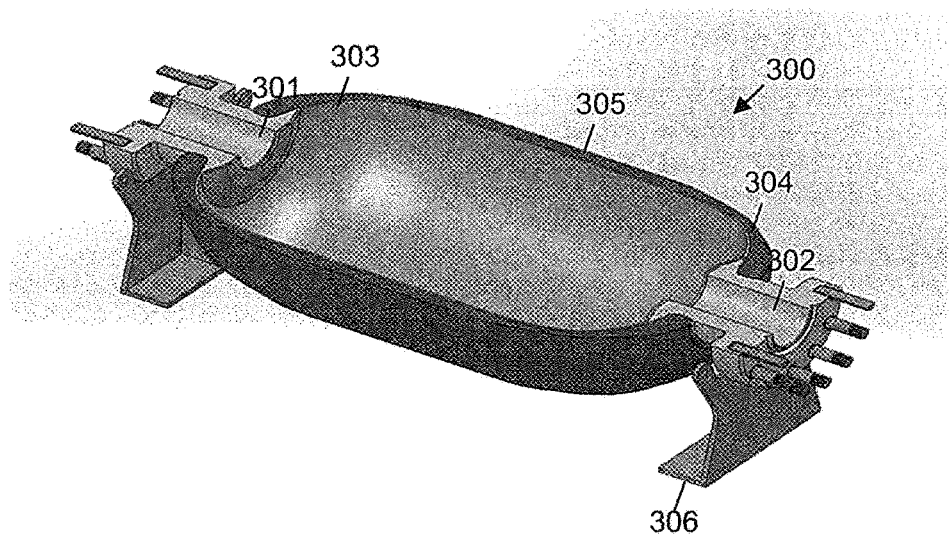
FIG. 3 is a cutaway perspective view of a composite pulsation dampener according to another embodiment of the disclosure.

FIG. 3 is a cutaway perspective view of a composite pulsation dampener according to another embodiment of the disclosure. The pulsation dampener 300 includes an inlet (or intake) 301 and outlet 302, each formed with a disk-shaped flange at the end extending into the interior of the body and surrounding an opening through the body of the pulsation dampener 300. Exterior annular flanges are provided on each of the inlet 301 and outlet 302 for securing the respective fluid conduit to other piping. The body of the pulsation dampener 300 is formed of identical half structures each including dome-shaped or elliptical end structures 303 and 304 at either end of a cylindrical center portion 305. The embodiment of FIG. 3 includes an integrated nozzle design of a metallic dome and piping flanges, with cylinder wall port openings for vent and drain connections. The integrated nozzle flanges provide mounting locations for both vertical and horizontal support structures and lifting lugs.

The materials of the body of the pulsation dampener 300 are the same as those described above in connection with the embodiment of FIG. 1. A non-load bearing polymer liner inside the pressure vessel is chemically compatible with the drilling fluids used in the oil and gas industry, and is capable of sealing the fluids under pressures as great as 10,000 pounds per square inch (psi) (or even higher, up to 15,000 or even 20,000 psi), and further may be continuously operating within the cyclic pressures of the system, and at temperatures ranging from −65° F. to 250° F.

A galvanic corrosion barrier and shock isolation shear ply is located between the composite dome and metallic nozzles. This shear ply reduces the galvanic incompatibility of carbon and metals. In addition, the shear ply operates as an acoustic or shock isolation system, reducing the acoustic emissions of the pulsation control device. These improvements extend the service life of the pulsation control device.

Figure 4:
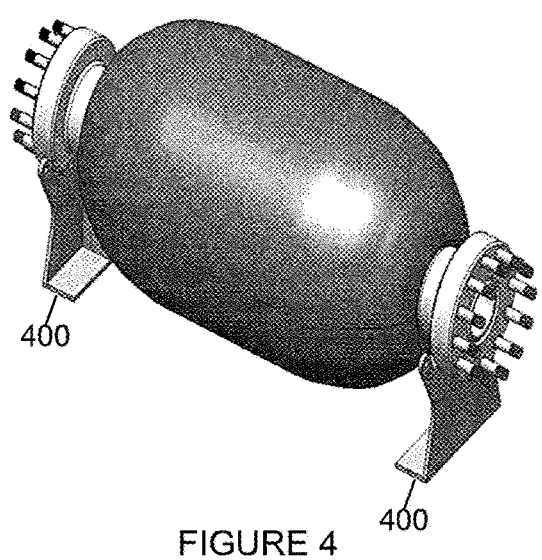
FIG. 4 is an external perspective view of the composite pulsation dampener of FIG. 3 in a vertical mount orientation.

FIG. 4 is an external perspective view of the composite pulsation dampener of FIG. 3 in a vertical mount orientation. Mounting brackets 400 secured to the external annular flanges on the inlet 301 and the outlet 302 may be used to support the pulsation dampener 300.

Figure 5:
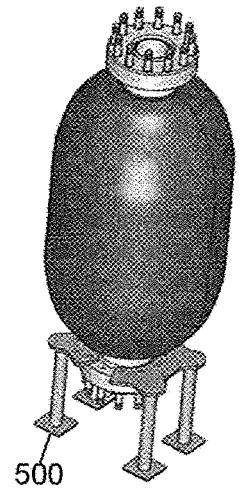
FIG. 5 is an external perspective view of the composite pulsation dampener of FIG. 3 in a vertical mount orientation.

FIG. 5 is an external perspective view of the composite pulsation dampener of FIG. 3 in a vertical mount orientation. A mounting stand 500 secured to the external annular flange on one of the inlet 301 and the outlet 302 may be used to support the pulsation dampener 300.

Figure 6:
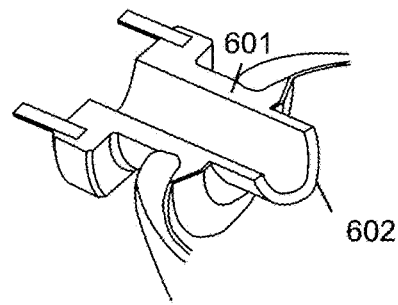
FIG. 6 is a cutaway perspective view of portions of the composite pulsation dampener of FIG. 3.

FIG. 6 is a cutaway perspective view of portions of the composite pulsation dampener of FIG. 3. The embodiment shown includes an extended inlet nozzle 602 on the inlet 601. The dome flange of the nozzle protrudes a distance into the pressure vessel, thus reducing the erosion effects of the polymer liner, extending the service life of the pulsation control device.

Although the present disclosure has been described with exemplary embodiments, various changes and modifications may be suggested to one skilled in the art. It is intended that the present disclosure encompass such changes and modifications as fall within the scope of the appended claims. The composite pulsation dampener.

What is claimed is:

1. A pulsation control device, comprising:
   a body constructed of a composite, non-metallic material and having a polymer liner, the body forming an annular cylinder with a plurality of dome-shaped ends and sealing fluids under pressure inside, the body formed with identical half structures each including dome-shaped or elliptical end structures at either end of a center portion; and
   a metallic inlet nozzle and a metallic outlet nozzle each within an opening in one of the dome-shaped ends of the body, the metallic inlet nozzle and the metallic outlet nozzle permitting fluid flow into and out of the body.

2. The pulsation control device according to claim 1, further comprising:
   a galvanic corrosion barrier and a shock isolation shear ply located between portions of the dome-shaped ends of the body and the metallic inlet nozzle and the metallic outlet nozzle.

3. The pulsation control device according to claim 1, wherein the polymer is chemically compatible with oil and gas industry drilling fluids.

4. The pulsation control device according to claim 1, further comprising:
   a pressure drop tube extending from an opening through an exterior wall of the body into an interior space within the body.

5. The pulsation control device according to claim 1, further comprising:
   a pressure drop structure affixed to one of the metallic inlet nozzle and the metallic outlet nozzle.

6. The pulsation control device according to claim 1, wherein the metallic inlet nozzle and the metallic outlet nozzle each include a plurality of integrated nozzle flanges that provide a plurality of mounting locations for both a plurality of support structures and a plurality of lifting lugs.

7. The pulsation control device according to claim 1, wherein the pulsation control device may be mounted horizontally or vertically.

8. A pulsation control device, comprising:
   a body constructed of a composite, non-metallic material and having a polymer liner chemically compatible with oil and gas industry drilling fluids, the body forming an annular cylinder with a plurality of dome-shaped ends, the body formed with identical half structures each including a dome-shaped or elliptical end structures at either end of a center portion; and
   a metallic inlet nozzle and a metallic outlet nozzle each within an opening in one of the dome-shaped ends of the body, the metallic inlet nozzle and the metallic outlet nozzle permitting fluid flow into and out of the body and each including integrated a plurality of nozzle flanges that provide a plurality of mounting locations for both a plurality of support structures and a plurality of lifting lugs.

9. The pulsation control device according to claim 8, further comprising:
   a galvanic corrosion barrier and a shock isolation shear ply located between portions of the dome-shaped ends of the body and the metallic inlet nozzle and the metallic outlet nozzle.

10. The pulsation control device according to claim 9, wherein each of the metallic inlet nozzle and the metallic outlet nozzle includes a disk-shaped flange at an end interior to the body, wherein the galvanic corrosion barrier and the shock isolation shear ply is disposed between the disk-shaped flanges and the portions of the dome-shaped ends of the body.

11. The pulsation control device according to claim 8, further comprising:
   a pressure drop tube extending into an interior space within the body.

12. The pulsation control device according to claim 8, further comprising:
   a pressure drop structure affixed to one of the metallic inlet nozzle and the metallic outlet nozzle.

13. The pulsation control device according to claim 8, wherein the pulsation control device is mounted horizontally or vertically.

14. The pulsation control device according to claim 8, wherein the metallic inlet nozzle includes an extension extending into an interior of the body.

15. The pulsation control device according to claim 8, wherein the body and an exostructure is formed using fiber/polymer composite materials reducing acoustic emissions and providing vibration dampening of pulsation pressure surges.

* * * * *

UNITED STATES PATENT AND TRADEMARK OFFICE
CERTIFICATE OF CORRECTION

PATENT NO. : 9,695,970 B2
APPLICATION NO. : 14/509961
DATED : July 4, 2017
INVENTOR(S) : John Thomas Rogers et al.

It is certified that error appears in the above-identified patent and that said Letters Patent is hereby corrected as shown below:

In the Claims

In Column 5 at Line 32 (Claim 8), replace "including integrated a plurality of" with "including a plurality of integrated."

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*